(12) United States Patent
Kim et al.

(10) Patent No.: US 10,733,995 B2
(45) Date of Patent: Aug. 4, 2020

(54) SOUND RECOGNITION ELECTRONIC DEVICE

(71) Applicant: Samsung Electronics Co., Ltd., Gyeonggi-do (KR)

(72) Inventors: Jin-Wook Kim, Gyeongsangbuk-do (KR); Jae-Hyung Kim, Gyeonggi-do (KR); Gi-Ha Woo, Seoul (KR)

(73) Assignee: Samsung Electronics Co., Ltd (KR)

( * ) Notice: Subject to any disclaimer, the term of this patent is extended or adjusted under 35 U.S.C. 154(b) by 131 days.

(21) Appl. No.: 15/614,001

(22) Filed: Jun. 5, 2017

(65) Prior Publication Data
US 2018/0096688 A1  Apr. 5, 2018

(30) Foreign Application Priority Data

Oct. 4, 2016  (KR) ................. 10-2016-0127868

(51) Int. Cl.
| | |
|---|---|
| *G10L 15/28* | (2013.01) |
| *G10L 25/51* | (2013.01) |
| *G10L 17/00* | (2013.01) |
| *G10L 15/22* | (2006.01) |
| *H05B 47/12* | (2020.01) |
| *G06F 3/16* | (2006.01) |

(52) U.S. Cl.
CPC ............. *G10L 15/28* (2013.01); *G06F 3/167* (2013.01); *G10L 17/005* (2013.01); *G10L 25/51* (2013.01); *H05B 47/12* (2020.01); *G10L 15/22* (2013.01)

(58) Field of Classification Search
CPC .............. H05B 37/0236; G10L 15/28
USPC .................................................. 704/275
See application file for complete search history.

(56) References Cited

U.S. PATENT DOCUMENTS

| | | | | |
|---|---|---|---|---|
| 5,209,695 | A * | 5/1993 | Rothschild | A63H 11/10 367/197 |
| 6,497,607 | B1 | 12/2002 | Hampton et al. | |
| 6,853,880 | B2 * | 2/2005 | Sakagami | G06N 3/008 318/568.2 |
| 9,659,577 | B1 * | 5/2017 | Langhammer | G10L 21/06 |
| 9,939,896 | B2 * | 4/2018 | Teller | G06F 3/013 |
| 2001/0049248 | A1 * | 12/2001 | Choi | A63H 11/00 446/356 |

(Continued)

FOREIGN PATENT DOCUMENTS

| | | | | |
|---|---|---|---|---|
| EP | 1217608 A2 * | 6/2002 | | G10L 15/26 |
| KR | 1020140065162 | 5/2014 | | |

*Primary Examiner* — Daniel C Washburn
*Assistant Examiner* — Oluwadamilola M Ogunbiyi
(74) *Attorney, Agent, or Firm* — The Farrell Law Firm, P.C.

(57) ABSTRACT

A voice recognition electronic device is provided which includes a housing including a first face that faces a first direction, a second face that faces a second direction opposite to the first direction, a third face disposed between the first face and the second face, and a translucent cover that forms at least a portion of the third face, a voice reception unit disposed below the first face of the housing and including a plurality of microphones that receive a voice input from a user, a light source unit disposed inside the housing to emit light, a driving unit connected to the light source unit to control the light source unit to move according to a preset operation, and a control unit that controls the driving unit in response to the voice input of the user, which is delivered from the voice reception unit.

20 Claims, 17 Drawing Sheets

(56) References Cited

U.S. PATENT DOCUMENTS

| | | | | |
|---|---|---|---|---|
| 2002/0044066 | A1* | 4/2002 | Dowling | A63J 17/00 340/815.46 |
| 2003/0185410 | A1* | 10/2003 | June | H04R 1/406 381/94.1 |
| 2004/0054531 | A1* | 3/2004 | Asano | G10L 15/20 704/231 |
| 2006/0143017 | A1* | 6/2006 | Sonoura | G10L 15/26 704/275 |
| 2006/0271404 | A1* | 11/2006 | Brown | A61B 5/0002 705/2 |
| 2009/0125308 | A1* | 5/2009 | Ambler | G10L 15/26 704/254 |
| 2009/0125311 | A1* | 5/2009 | Haulick | B60R 16/0373 704/275 |
| 2009/0278473 | A1* | 11/2009 | Van Erp | H02J 13/0003 315/294 |
| 2011/0124264 | A1* | 5/2011 | Garbos | A63H 3/28 446/147 |
| 2011/0125504 | A1* | 5/2011 | Ko | B25J 13/003 704/275 |
| 2014/0172432 | A1* | 6/2014 | Sendai | G10L 21/10 704/276 |
| 2015/0073907 | A1* | 3/2015 | Purves | G06Q 20/32 705/14.58 |
| 2015/0314454 | A1 | 11/2015 | Breazeal et al. | |
| 2016/0150338 | A1* | 5/2016 | Kim | G08B 1/08 381/58 |
| 2016/0199977 | A1 | 7/2016 | Breazeal | |
| 2017/0154176 | A1* | 6/2017 | Yun | G06F 3/167 |
| 2017/0318919 | A1* | 11/2017 | Gharabegian | A45B 25/00 |
| 2017/0330415 | A1* | 11/2017 | Sato | G07F 17/3209 |
| 2017/0347468 | A1* | 11/2017 | Kim | H05K 5/0004 |
| 2017/0359467 | A1* | 12/2017 | Norris | H04M 3/568 |

* cited by examiner

SOUND RECOGNITION ELECTRONIC DEVICE

PRIORITY

This application claims priority under 35 U.S.C. § 119(a) to Korean Patent Application Serial No. 10-2016-0127868, which was filed in the Korean Intellectual Property Office on Oct. 4, 2016, the entire content of which is incorporated herein by reference.

BACKGROUND

1. Field of the Disclosure

The present disclosure generally relates to an electronic device, and more particularly to a voice recognition electronic device that recognizes a user's voice and implements a service with light and/or sound.

2. Description of the Related Art

An electronic device refers to a device that performs a specific function according to a program stored therein, such as an electronic scheduler, a portable multimedia player, a mobile communication terminal, a tablet PC, an image/sound device, a desktop/laptop PC, or a vehicle navigation system, as well as a home appliance.

Recently, electronic devices, which are capable of utilizing a cloud-based voice service having new functions, have been developed, and as the distribution of the electronic devices has expanded, the proportion of voice recognition electronic devices in people's lives have gradually increased.

In addition, as Internet of things (IoT) devices become popular with the development of technology, users may manage and control IoT devices in an office or home by voice or mobile communication, and may be provided with an emotional feedback by utilizing a lighting technology that is responsive to voice recognition.

SUMMARY

An aspect of the present disclosure provides a voice recognition electronic device which allows the user to confirm whether the voice delivered by the user is correctly delivered through a motion of a light source and an interaction with the user according to a change in the color and/or pattern of the light source.

Another aspect of the present disclosure provides a voice recognition electronic device which includes various sensory expressions of a scenario to a user by using a single structure including a movable light source.

According to another aspect of the present disclosure, a voice recognition electronic device is provided which includes a housing including a first face that faces a first direction, a second face that faces a second direction opposite to the first direction, a third face disposed between the first face and the second face, and a translucent cover that forms at least a portion of the third face, a voice reception unit disposed below the first face of the housing and including a plurality of microphones that receive a voice input from a user, a light source unit disposed inside the housing to emit light, a driving unit connected to the light source unit to control the light source unit to move according to a preset operation, and a control unit that controls the driving unit in response to the voice input of the user, which is delivered from the voice reception unit.

According to another aspect of the present disclosure, a non-transitory computer-readable recording medium is provided which stores a program to be executed on a processor. The program includes a command that, when executed by the processor, causes the processor to, when a first voice input acquired from a user corresponds to a preset voice input, detect the intensity of the first voice input, recognize a direction of the user by using the detected intensity of the first voice input, drive a light source unit of an electronic device such that the light source unit faces the recognized direction of the user, and control a driving unit of the electronic device such that the light source unit is moved in a preset first operation when a second voice input acquired from the user is recognized after the light source unit is driven to face the recognized direction of the user.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
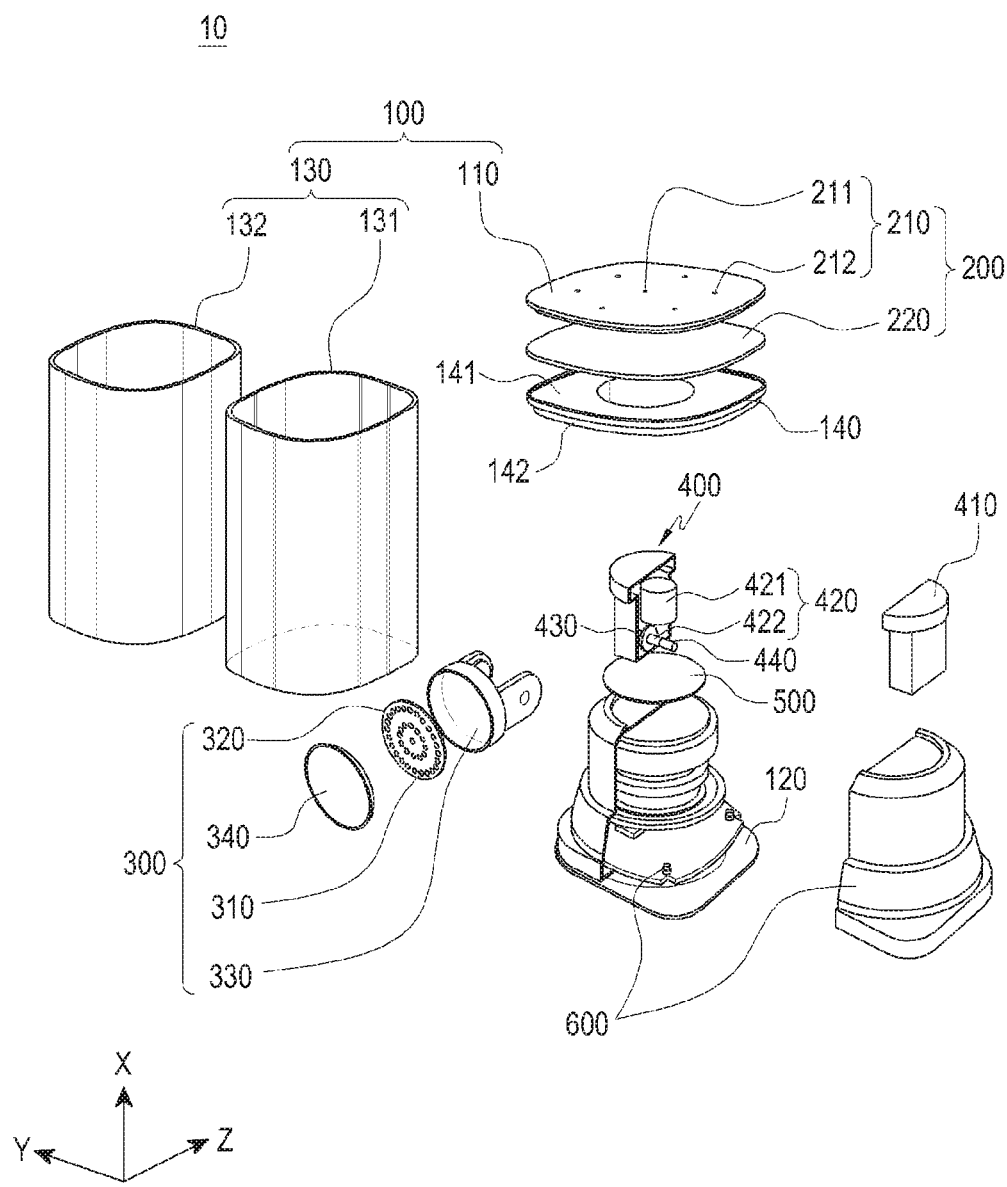
FIG. 1 is an exploded perspective view illustrating a voice recognition electronic device according to an embodiment of the present disclosure.

Hereinafter, certain embodiments of the present disclosure will be described with reference to the accompanying drawings. The embodiments and the terms used herein do not limit the technology disclosed herein to specific forms, and should be understood to include various modifications, equivalents, and/or alternatives to the corresponding embodiments. In describing the drawings, similar reference numerals may be used to designate similar elements.

A singular expression may include a plural expression unless they are different in a context. As used herein, singular forms may include plural forms as well unless the context clearly indicates otherwise. The expressions "a first", "a second", "the first", or "the second" as used in an embodiment of the present disclosure may modify various components regardless of the order and/or the importance, but do not limit the corresponding components. When an element (e.g., first element) is referred to as being "(functionally or communicatively) connected," or "directly coupled" to another element (second element), the element may be connected directly to the another element or connected to the other element through another element (e.g., a third element).

The expression "configured to" as used in the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). The electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), a point of sales (POS) terminal, or an IoT device (e.g., a light bulb, various sensors, electric or gas meter, a sprinkler device, a fire alarm, a thermostat, a streetlamp, a toaster, a sporting good, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. The electronic device is not limited to the above described devices.

In the present disclosure, the term "user" may indicate a person using an electronic device or a device (e.g., an artificial intelligence electronic device) using an electronic device.

The terms used herein are merely for the purpose of describing particular embodiments and do not limit the scope of other embodiments. A singular expression may include a plural expression unless they are different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

A voice recognition electronic device according to an embodiment of the present disclosure is capable of implementing a stable interaction with a user through an emotional and intuitive voice recognition reaction through a motion of a circular light source.

The voice recognition electronic device according to an embodiment of the present disclosure is capable of providing various expressions of a scenario mode to the user by using a single structure including a movable light source.

The voice recognition electronic device according to an embodiment of the present disclosure is capable of providing an easy and friendly voice recognition system to the user through a sensible motion of a light source and a change in the color and/or pattern of the light source.

FIG. 1 is an exploded perspective view illustrating a voice recognition electronic device 10 according to an embodiment of the present disclosure.

In FIG. 1, an "X-axis" in an orthogonal coordinate system may correspond to the upward direction of the voice recognition electronic device 10, a "Y-axis" may correspond to the downward direction of the voice recognition electronic device 10, and a "Z-axis" may correspond to an outward direction from the center of the voice recognition electronic device 10. In addition, in an embodiment of the present disclosure, the "X-axis direction" may refer to a first direction X, the "Y-axis direction" may refer to as a second direction Y, and the "Z-axis direction" may refer to a third direction Z.

As illustrated in FIG. 1, the voice recognition electronic device 10 includes a housing 100, a voice reception unit 200, a speaker module 600, a light source unit 300, and a driving unit 400. The housing 100 includes a first face 110 that faces a first direction X, a second face 120 that faces a second direction Y that is opposite to the first direction X, and a third face 130 that is disposed between the first face 110 and the second face 120. According to an embodiment of the present disclosure, the housing 100 may include a translucent cover 131 that forms at least a portion of the third face 130.

According to an embodiment of the present disclosure, the first face 110 of the housing 100 may include an upper cover that protects the top surface thereof. The first face 110 is disposed to face a voice reception unit 200 that receives a sound source voice delivered from the outside, and may be made of a material that is capable of transmitting radio waves or magnetic fields therethrough (e.g., a tempered glass or a synthetic resin).

According to an embodiment of the present disclosure, the first face 110 may be provided with a plurality of microphone holes 210 capable of delivering a user's voice to the voice reception unit 200, and a keypad including a mechanically operated button or a touch key may be provided at a side region of the first face 110. For example, the plurality of microphone holes 210 may include a first hole 211 at the center of the first face 110 and six second holes 212 disposed on a line forming a circle around the first hole 211 as a center. The keypad may generate an input signal due to the user's body contact, and may deliver the input signal to a printed circuit board 220 disposed therebelow. The keypad may be implemented with only mechanical buttons, or with only touch keys. However, the number and arrangement of the holes disposed in the first face 110 and the configuration of the keypad are not limited thereto, and may be configured with various numbers and arrangements that are capable of recognizing the user's voice accurately and may be conveniently used by the user.

According to an embodiment of the present disclosure, the second face 120 of the housing 100 may include a lower cover that protects the rear face of the housing 100, and may be configured as a flat surface such that the voice recognition electronics 10 may be mounted upright on an outer bottom face. The second face 120 is mounted to face in a direction opposite to the first face 110, and may form the appearance of the voice recognition electronic device 10 together with the first face 110 and the third face 130.

According to an embodiment of the present disclosure, the third face 130 of the housing 100 is disposed between the first face 110 and the second face 120, and may include a translucent cover 131 that forms an outer face of the electronic device 10 and an outer skin member 132 disposed outside the translucent cover 131. The third face 130 may be configured as a curved surface in order to implement a natural motion of the light emitted from the light source unit 300. The translucent cover 131 may be made of an acrylic material, and may be implemented as being translucent so that the light emitted from the light source unit 300 may be recognized from the outside. The outer skin member 132 is formed in a shape corresponding to the translucent cover 131, and may be made of, for example, a fabric material in order to provide a smooth aesthetic feeling on the outer surface of the electronic device 10.

According to an embodiment of the present disclosure, the voice reception unit 200 may be disposed below the first face 110 and may receive a voice signal such as a user's command delivered from the outside. The voice reception unit 200 may include a plurality of microphone holes 210 disposed on the first face 110 and a printed circuit board 220 disposed below the microphone holes 210. For example, a processor, a communication module, various interfaces, a power management module, and the like may be mounted on the printed circuit board 220 in a form of an integrated circuit chip. A control circuit may be configured as an integrated circuit chip and may be mounted on the printed circuit board 220. For example, the control circuit may be a portion of the above-described processor or communication module. The voice reception unit 200 may further include a support member 140 on which the printing circuit board 220 is seated and which may be electrically connected to the driving unit 400 disposed below the voice reception unit 200.

According to an embodiment of the present disclosure, the support member 140 includes an upper seating groove 141 in which the printed circuit board 220 is seated, and a stepped portion 142 that is capable of being coupled to the translucent cover 131. For example, the upper seating groove 141 may be disposed inside the support member 140, and may be formed in a shape corresponding to that of the printed circuit board 220. The stepped portion 142 may include at least one step to be coupled to the upper end of the translucent cover 131 in a fitting manner.

Figure 2:
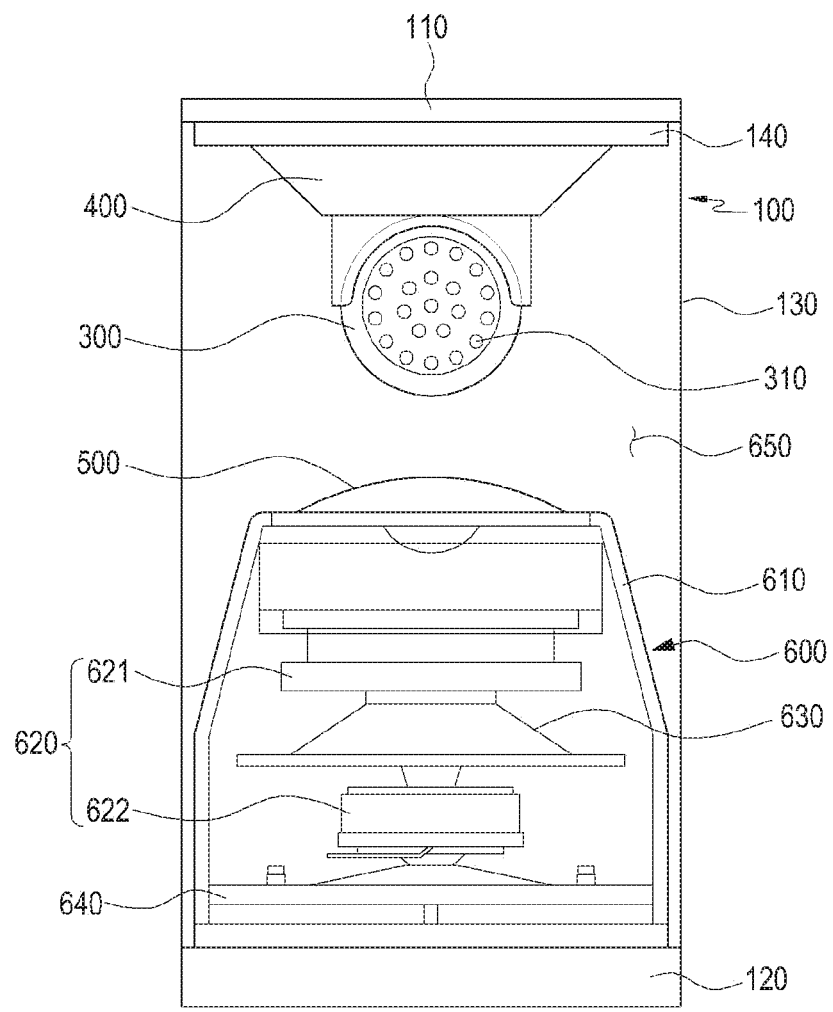
FIG. 2 is a projected perspective view illustrating an inner structure of a voice recognition electronic device according to an embodiment of the present disclosure.

According to an embodiment of the present disclosure, the light source unit 300, which provides light, is disposed in a resonance space 650 in FIG. 2 of the speaker module 600, and is electrically connected to the printed circuit board 220 to be capable of emitting light. The light source unit 300 may include a plurality of LEDs, and the plurality of LEDs may be disposed to form at least one array or to form at least one pattern.

According to an embodiment of the present disclosure, the speaker module 600 may be disposed on the top of the second face 120, and may be configured as an omnidirectional speaker system to emit sound omnidirectionally. The speaker module 600 may provide the user with a necessary response to the user's command received from the outside. The speaker module 600 is connected to a natural language user interface mounted on the print circuit unit 220 so as to answer the user's question, provide a recommendation, or process a web service request to acoustically output a result obtained.

According to an embodiment of the present disclosure, the driving unit 400 may be disposed inside the housing 100 and may be connected to the light source unit 300 so as to change the orientation of the light source unit 300. The driving unit 400 may include a main body 410, at least one gear 430, and a driving motor 420 that is engaged with the gear to rotationally drive the gear. A shaft 440 is disposed at the center of the gear that is rotated by being engaged with the driving motor 420, and may be exposed to the outside of the main body 410 of the driving unit 400. The exposed shaft 440 may be connected to the main body 410 of the driving unit 400, and may provide a rotational motion of the light source unit 300.

FIG. 2 is a projected perspective view illustrating an inner structure of an voice recognition electronic device 10 according to an embodiment of the present disclosure.

Figure 3:
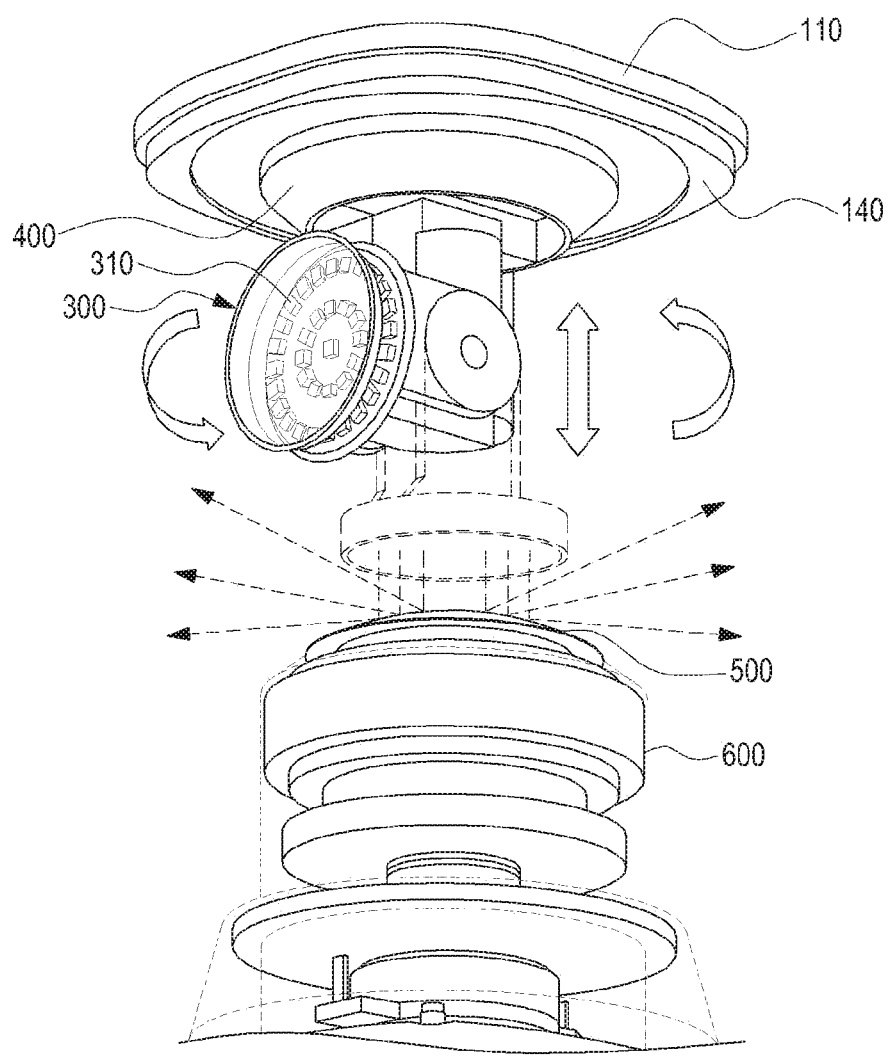
FIG. 3 is a perspective view illustrating motion in a rotating direction of a driving unit of a voice recognition electronic device according to an embodiment of the present disclosure.

FIG. 3 is a perspective view illustrating a motion in a rotating direction of a driving unit 400 of the voice recognition electronic device 10 according to an embodiment of the present disclosure.

The housing 100, the speaker module 600, and the light source unit 300 of the voice recognition electronic device 10 illustrated in FIGS. 2 and 3 may correspond to the housing 210, the speaker module 600, and the light source unit 300 of FIG. 1.

Referring to FIGS. 1, 2 and 3, the voice recognition electronic device 10 includes the driving unit 400, the light source unit 300, and the speaker module 600 within the housing 100 thereof. The outer face of the housing 100 may be a cylindrical translucent cover 131 or a polygonal translucent cover 131 including a curved face. An omnidirectional speaker module 600 is disposed in the lower portion of the housing 100 to provide stereoscopic sound, and a woofer resonance space 650 may be formed above the speaker module 600.

According to an embodiment of the present disclosure, the speaker module 600 includes a vertical tubular case 610 and speaker units 620 disposed in the upper and lower portions of the case 610. The first speaker unit 621 disposed in the upper portion of the case 610 may be a speaker for high tone and the second speaker unit 622 disposed in the lower portion of the case 610 may be a speaker for low pitched tone. A baffle plate 630 may be disposed between the first speaker unit 621 and the second speaker unit 622, and a base 640 may be disposed on the bottom face of the case 610. The speaker module 600 may correspond to a general configuration of an omnidirectional speaker, and a detailed description thereof will be omitted.

According to an embodiment of the present disclosure, the driving unit 400 and the light source unit 300 may be disposed in the woofer resonance space 650 above the speaker module 600. In order to change the orientation of the light source unit 300, the driving unit 400 may include a main body 410, at least one gear 440, and a driving motor 420 that is engaged with the gear to rotationally drive the gear.

According to an embodiment of the present disclosure, there may be provided a plurality of driving motors 420, in which a first driving motor 421 may provide a vertical motion of the light source unit 300 and a second driving motor 422 may provide a horizontal motion of the light source unit 300. For example, the first driving motor 421 may have an axial center that is arranged on the same line as the center of the housing 100, and the light source unit 300 may be operated omnidirectionally (360 degrees) in a state of facing the third face 130. For example, the second driving motor 422 may be disposed such that the center of the axis faces the third face (the third direction Z), so that the light source unit 300 is rotated about +90 degrees with respect to the second face 120 or −90 degrees with respect to the first face 110. In this case, with the driving of the light source unit 300 by the driving unit 400, when the light emitted from the light source unit 300 moves while being directed to the translucent cover 131, a natural and smooth motion may be shown on the surface of the housing 100.

According to an embodiment of the present disclosure, the light source unit 300 may include a concave lens mounted on outer faces of a plurality of LEDs so as to control the images of a plurality of light beams emitted from the LEDs to be focused on the inner or outer surface of the housing 100 without emitting light to the outside of the housing 100.

According to an embodiment of the present disclosure, a reflective plate 500 may be disposed between the driving unit 400 and the speaker module 600. For example, the reflective plate 500 may be disposed on the top face of the speaker module 600, and the reflective plate 500 may include a hemispherical reflecting mirror protruding in the first direction X to irregularly diffuse the light emitted from the light source unit 300. When the driving unit 400 disposed below the first face 110 is adjusted to face the second direction Y and the light source unit 300 is disposed to face the reflection plate 500, the light emitted from the light source unit 300 may be directed to the reflective plate 500. The light emitted from the light source unit 300 may be reflected by the reflective plate 500 and the light reflected by the reflective plate 500 may be irregularly diffused within the housing 100 to illuminate the entire interior of the voice recognition electronic device 10. Accordingly, the irregularly reflected light is able to implement optical gradation for brightly illuminating the inner space of the voice recognition electronic device 10. For example, a gentle illumination effect may be provided by implementing a color gradation in the entire electronic device 10 using various colors in the light emitted from the light source unit 300.

Figure 4:
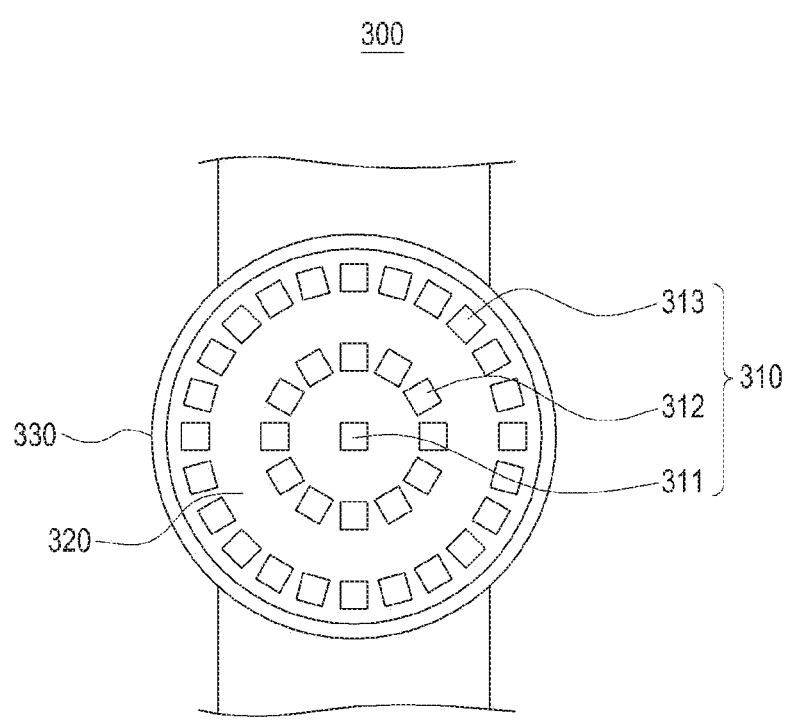
FIG. 4 is a front view illustrating a structure of a light source unit of a voice recognition electronic device according to an embodiment of the present disclosure.

FIG. 4 is a front view illustrating a structure of the light source unit 300 of the voice recognition electronic device 10 according to an embodiment of the present disclosure.

Referring to FIG. 4, the light source unit 300 includes a case 330 extending from the main body 410 of the driving unit 400 and having a cylindrical shape, a printed circuit board 320 mounted inside the case 330, and a light source 310 disposed on the printed circuit board 320.

According to an embodiment of the present disclosure, the light source 310 of the light source unit 300 may be a plurality of LEDs arranged in a circular shape, and may have at least one array. For example, the light source 310 may include a plurality of LEDs that form a predetermined pattern on a printed circuit board 320, and may include a central light source 311, an inner light source 312 disposed around the central light source 311, and an outer light source 313 disposed around the inner light source 312. The printed circuit board 320 may have a circular shape.

According to an embodiment of the present disclosure, the central light source 311 may be disposed at the center of the light source unit 300, and a plurality of inner light sources 312 may be arranged in a circular line to surround the central light source 311. A plurality of the external light sources 313 may be arranged in a circular line to surround the internal light sources 312. The plurality of light sources 310 may have the same size, and a larger number of light sources 310 may be arranged from the center to the outer side. For example, the number of the inner light sources 312 may be larger than the number of the central light sources 311, and the number of the outer light sources 313 may be larger than the number of the inner light sources 312.

According to an embodiment of the present disclosure, the light sources 310 may be divided into a plurality of patterns such that the patterns are turned on differently according to a situation, and as a result, various kinds of light expressions may be provided along with the motion of the light sources 310 according to the driving unit 400 in various scenarios to be described below. For example, when the user's voice is recognized at a long distance from the electronic device 10, the entire light sources including the external light sources 313 may be turned on to form a large circular light source, and when the user's voice is recognized at a short distance from the electronic device 10, only the inner light sources 312 may be turned on to form a medium light source. The central light source 311 may be set to a state, such as a standby mode state.

Figure 5:
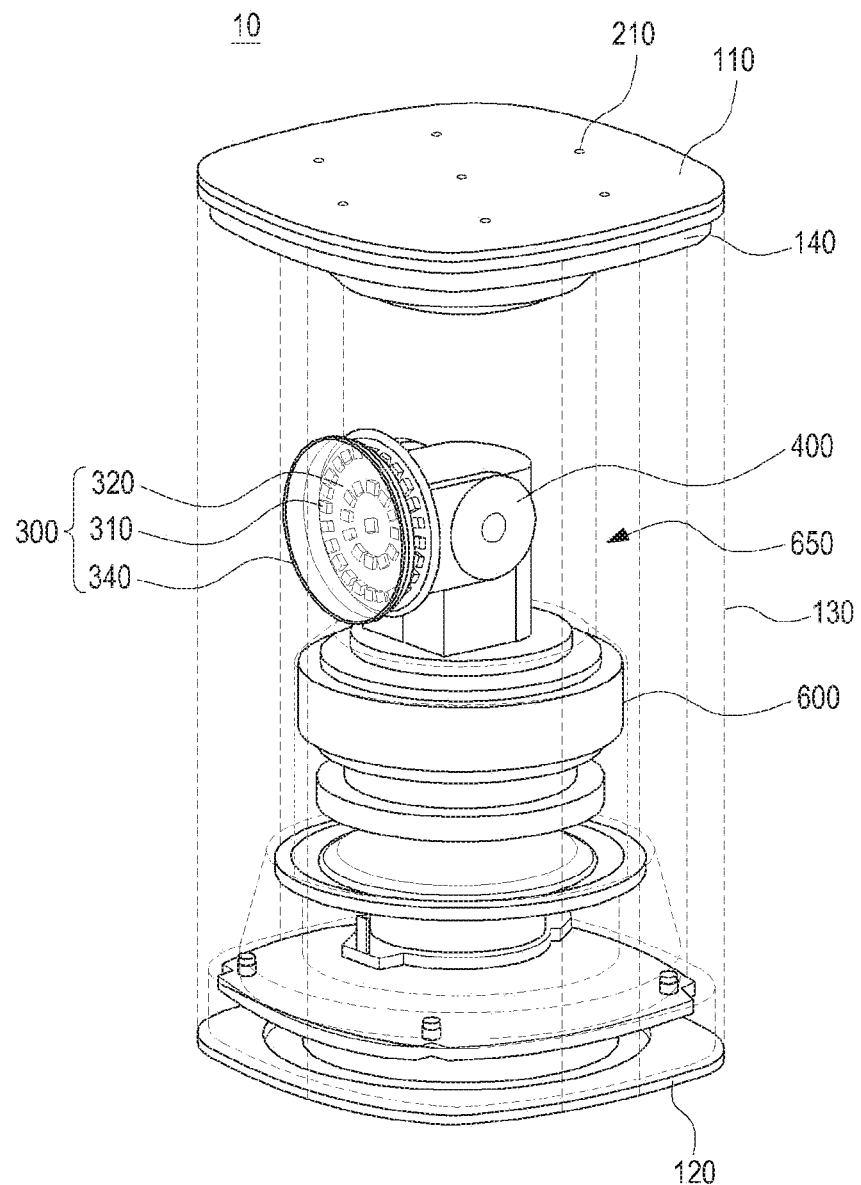
FIG. 5 is a projected perspective view illustrating an inner structure of a voice recognition electronic device according to another embodiment of the present disclosure.

FIG. 5 is a projected perspective view illustrating an inner structure of a voice recognition electronic 10 device according to another embodiment of the present disclosure.

A housing 100, a speaker module 600, and a light source unit 300 of the voice recognition electronic device 10 illustrated in FIG. 5 may correspond to the housing 210, the speaker module 600, and the light source unit 300 of FIG. 1.

Referring to FIGS. 1 and 5, the voice recognition electronic device 10 includes a driving unit 400, the light source unit 300, and the speaker module 600 within the housing 100 thereof. The outer face of the housing 100 may be a cylindrical translucent cover 131 or a polygonal translucent cover 131 including a curved face. An omnidirectional speaker module 600 is disposed in the lower portion of the housing 100 to provide stereoscopic sound, and a woofer resonance space 650 may be formed above the speaker module 600.

According to an embodiment of the present disclosure, the driving unit 400 and the light source unit 300 may be disposed in the woofer resonance space 650 above the speaker module 600. The driving unit 400 may be disposed above the speaker module 600 in a first direction X. In order to change the orientation of the light source unit 300, the driving unit 400 may include a main body 410, at least one gear, and a driving motor that is engaged with the gear to rotationally drive the gear.

According to an embodiment of the present disclosure, there may be provided a plurality of driving motors, in which a first driving motor may provide a vertical motion of the light source unit 300 and a second driving motor may provide a horizontal motion of the light source unit 300. With the driving of the light source unit 300 by the driving unit 400, when the light emitted from the light source unit 300 moves while being directed to the translucent cover 131, a natural and smooth motion of light may be shown on the surface of the housing 100.

According to an embodiment of the present disclosure, the light source unit 300 may include a concave lens mounted on outer faces of a plurality of LEDs so as to control the images of a plurality of light beams emitted from the LEDs to be focused on the inner or outer surface of the housing 100 without emitting light to the outside of the housing 100.

According to an embodiment of the present disclosure, a reflective plate 500 may be disposed above the driving unit 400. For example, the reflective plate 500 may be disposed on the first face 110 of the housing 100 or below the support member 140, and the reflective plate 500 may include a hemispherical reflecting mirror protruding in the second direction Y to irregularly diffuse the light emitted from the light source unit 300. When the driving unit 400 disposed above the speaker module 600 is adjusted to face the first direction X and the light source unit 300 is disposed to face the reflection plate 500, the light emitted from the light source unit 300 may be directed to the reflective plate 500. The light emitted from the light source unit 300 may be reflected by the reflective plate 500 and the light reflected by the reflective plate 500 may be irregularly diffused within the housing 100 to illuminate the entire interior of the voice recognition electronic device 10.

Figure 6:
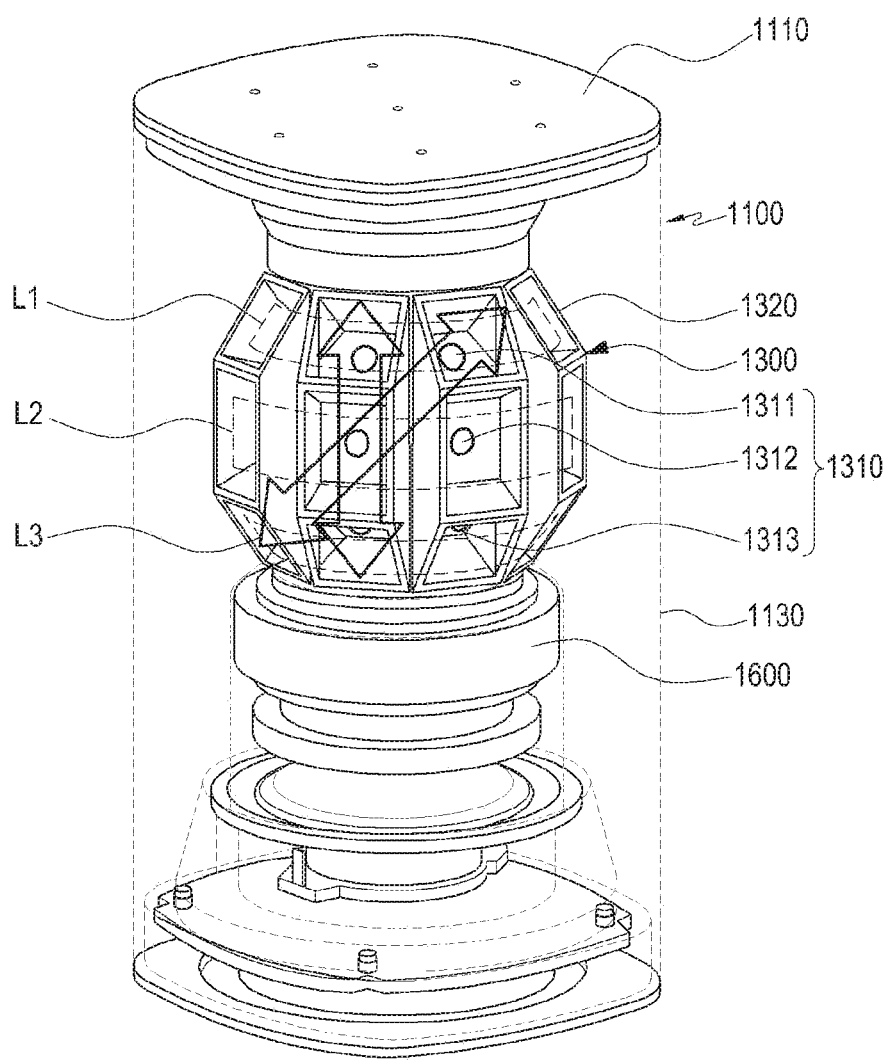
FIG. 6 is a projected perspective view illustrating an inner structure of a voice recognition electronic device according to another embodiment of the present disclosure.

FIG. 6 is a projected perspective view illustrating an inner structure 20 of a voice recognition electronic 20 device according to another embodiment of the present disclosure.

A housing 1100, a speaker module 1600, and a light source unit 1300 of the voice recognition electronic device 10 illustrated in FIG. 6 may correspond to the housing 210, the speaker module 600, and the light source unit 300 of FIGS. 1 and 2.

Referring to FIG. 6, the voice recognition electronic device 20 includes the light source unit 1300 and the speaker module 1600 within the housing 1100 thereof. The light source unit 1300 may be disposed between the speaker module 1600 and the first face 1110 of the housing 1100, and may include a plurality of light sources 1310. The light source 1310 of the light source unit 1300 may be configured with a plurality of LEDs, and may have at least one array of LEDs. For example, the light source 1310 may include a plurality of LEDs that form a predetermined pattern on a printed circuit board.

According to an embodiment of the present disclosure, the plurality of light sources 1310 of the light source unit 1300 may be arranged at different angles and in different directions on a spherical bracket 1320 so as to provide omnidirectional illumination. The bracket 1320 on which the light source 1310 is mounted may have a spherical shape or a polyhedral sphere shape. According to one example, in the case of the polyhedral sphere shape, the light source 1310 may be disposed in each plane region.

For example, the bracket 1320 of the polyhedral sphere shape may form at least 24 faces. The plurality of faces may include a first row L1 and a third row L3, each composed of eight faces, on the upper side and/or eight faces on the lower side with reference to the second row L2, composed of eight faces and oriented in the third direction Z, as a center. The light sources 1312 disposed in the second row L2 may emit light in the third direction Z toward the translucent cover 1130. The light sources 1311 and 1313 arranged in the first row L1 and third row L3 respectively, may be arranged to have a predetermined inclination so as to emit light, which forms a predetermined inclination with respect to the third direction Z, toward the translucent cover 1130. Each region may be partitioned by arranging a wall so that interference between light beams emitted from the light sources 310 may be minimized.

According to an embodiment of the present disclosure, the light source unit 1300 may implement a motion in an up and down direction, a motion in a left or right diagonal direction, and a rotational motion of the light sources 1310 as each of the plurality of light sources 1310 is individually turned on or off.

Hereinafter, the configurations of the speaker module and the housing are the same as those of FIG. 2, and thus descriptions thereof will be omitted.

Hereinafter, a scenario using an emotional interaction of the electronic device 10 will be described.

Figure 7:
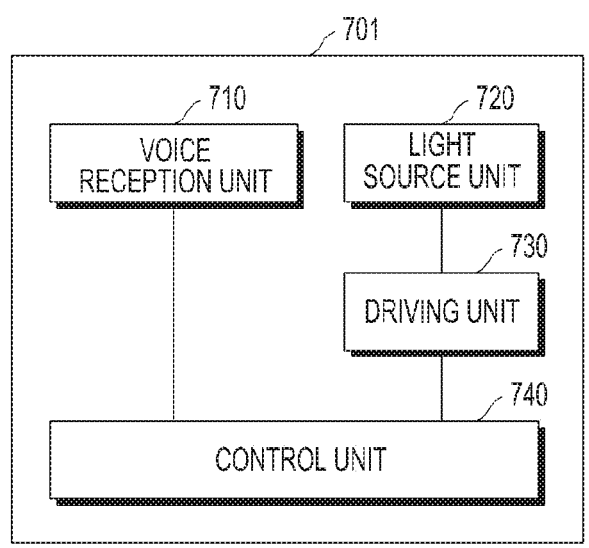
FIG. 7 is a block diagram of an electronic device according to an embodiment of the present disclosure.

FIG. 7 is a block diagram of an electronic device according to an embodiment of the present disclosure.

According to an embodiment of the present disclosure, the electronic device 700 includes a voice reception unit 710, a light source unit 720, a driving unit 730, and a control unit 740 in a housing thereof.

According to an embodiment of the present disclosure, the voice reception unit 710 may include a plurality of microphones that receive a user's voice. For example, the voice reception unit 710 may receive a voice input from the user through each of the plurality of microphones. The light source unit 720 may emit light toward the housing. In addition, the driving unit 730 may be connected to the light source unit 720, and may drive the light source unit according to a preset operation. For example, the driving unit 730 may control the light source unit 720 to move the light source unit 720 in a preset operation.

According to an embodiment of the present disclosure, the control unit 740 may control the motion of the driving unit 730 in response to the user's voice input delivered from the voice reception unit 710. The control unit 740 may be the above-described processor or communication module. The control unit 740 may control the driving unit 730 such that the light source unit 720 is moved according to the user's voice input. For example, when the user's voice input is delivered from the voice reception unit 710, the control unit 740 may recognize the user's voice input. The control unit 740 may inform the user that the electronic device 700 has recognized the user's voice input by controlling the driving unit 730 to move the light source unit 720 according to the recognized user's voice input.

In addition, the control unit 740 may execute a command corresponding to the recognized user's voice input. For example, the control unit 740 may execute a command corresponding to the recognized user's voice input and may output a result obtained by executing the command, through the light source unit 720 or a speaker module included in the electronic device 700. In addition, the control unit 740 may control other electronic devices according to a command corresponding to the recognized user's voice input. Hereinafter, a specific operation of the electronic device 700 according to the user's voice input will be described.

Figure 8:
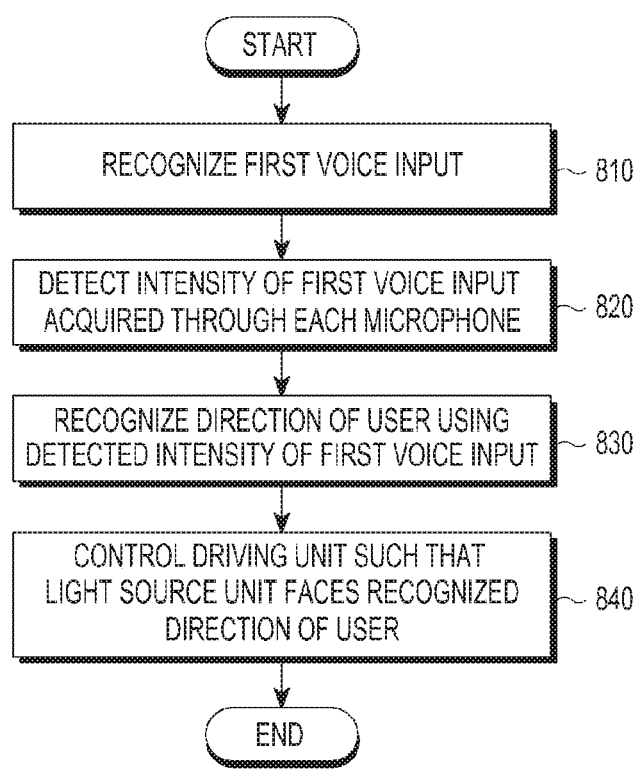
FIG. 8 is a flow chart of an operation corresponding to a first voice input by an electronic device according to an embodiment of the present disclosure.

FIG. 8 is a flow chart of an operation corresponding to a first voice input by the electronic device according to an embodiment of the present disclosure.

In step 810, the control unit 740 of the electronic device 700 recognizes a first voice input acquired from the user via the voice reception unit 710. The electronic device 700 may recognize the speech input acquired from the user in various ways, and the description of the specific method of recognizing the voice input will be omitted.

In step 820, when the acquired first voice input corresponds to a preset voice input, the control unit 740 detects the intensity of the first voice input acquired through each of the plurality of microphones of the voice reception unit 710. Here, the preset voice input may be a voice input preset in order to switch the electronic device 700 to an operation ready state.

Since the plurality of microphones are disposed at different positions, respectively, the distances between the plurality of respective microphones and the user are different from each other. Thus, the intensities of the first audio inputs detected through the plurality of respective microphones may be different from each other. Accordingly, the intensities of the first voice inputs, which are detected through the plurality of microphones, may be used in order to recognize the direction of the user.

In step 830, the control unit 740 recognizes the direction of the user using the intensity of the first voice input detected through each of the plurality of microphones.

In step 840, the control unit 740 controls the driving unit 730 such that the light source unit 720 faces the recognized direction of the user. In this manner, when the first voice input acquired from the user corresponds to the preset voice input, the control unit 740 may control the driving unit 730 such that the light source unit 720 faces the user so that the control unit 740 may inform the user of the recognition of the user's voice input by the electronic device 101.

For example, when no voice input is received for a preset time, the electronic device 700 may be switched to a standby state. In the standby state, the control unit 740 may control the light source unit 720 such that light is not emitted. When the first voice input received from the user in the standby state corresponds to the preset voice input, the electronic device 700 may be switched from the standby state to the operation ready state. Here, the operation ready state may indicate a state in which the electronic device 101 is ready to operate according to the user's voice input. In addition, in order to inform the user of switching to the operation ready state, the electronic device 101 may also control the driving unit 730 such that the light source unit 720 faces the direction of the user recognized based on the received voice input so that the user may intuitively recognize that the electronic device 700 is ready to operate according to his or her voice input.

Figure 9:
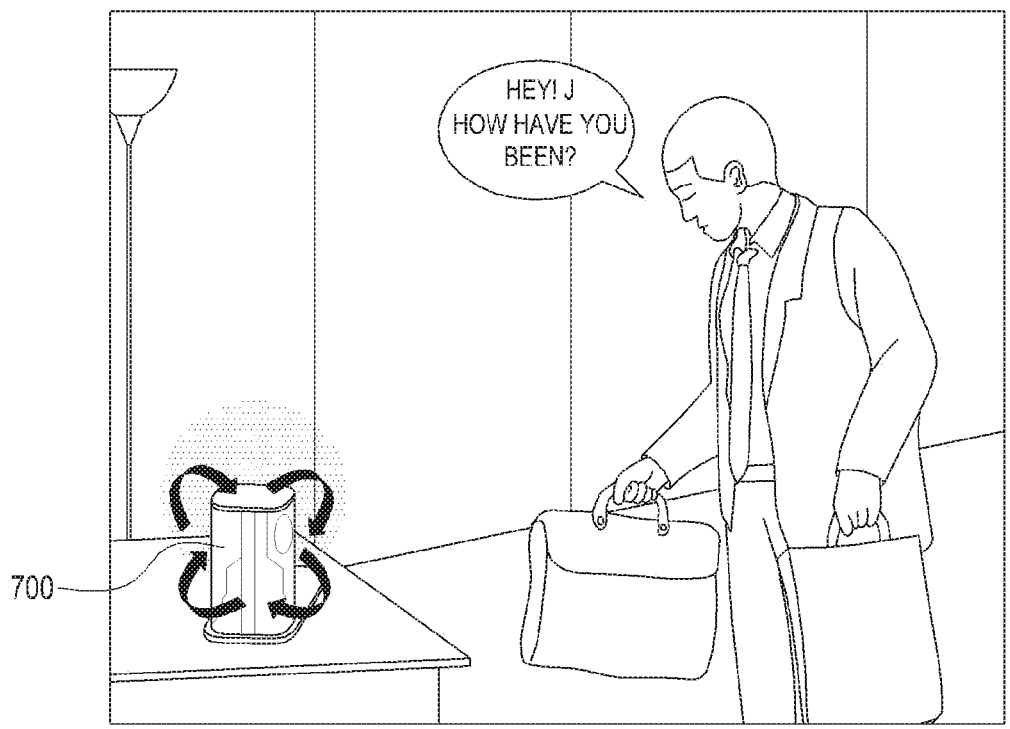
FIG. 9 is a situation diagram of an operation corresponding to a first voice input by an electronic device according to an embodiment of the present disclosure.

FIG. 9 is a situation diagram of an operation corresponding to a first voice input by an electronic device according to an embodiment of the present disclosure. Referring to FIG. 9, the control unit 740 of the electronic device 700 may receive a first voice input "Hey! J, how have you been?" from the user via the voice reception unit 710, and may recognize the received first voice input. Hereinafter, it is assumed that the preset voice input is "Hey! J." Since the recognized first voice input includes a voice input that is a preset voice input "Hey! J," the control unit 740 may determine that the first voice input received from the user corresponds to the preset voice input. Accordingly, the control unit 740 may detect the intensity of the user's first voice input acquired through each of the plurality of microphones of the voice reception unit 710, and may detect the direction of the user using the detected intensity of the detected first voice input. The control unit 740 may control the driving unit 730 such that the light source unit 720 faces the recognized direction of the user. The user may confirm that the light source unit 720 of the electronic device 700 faces him/her according to the user's first voice input, and the electronic device 700 may recognize the user's first voice input and may intuitively recognize that the electronic device 700 is switched to a ready state to perform an operation.

After controlling the driving unit 730 such that the light source unit 720 faces the recognized direction of the user, the control unit 740 may control the driving unit 730 such that the light source unit 720 moves in a preset operation in order to provide an effect of welcoming the user, and may output preset music through the speaker module of the electronic device 700.

Figure 10:
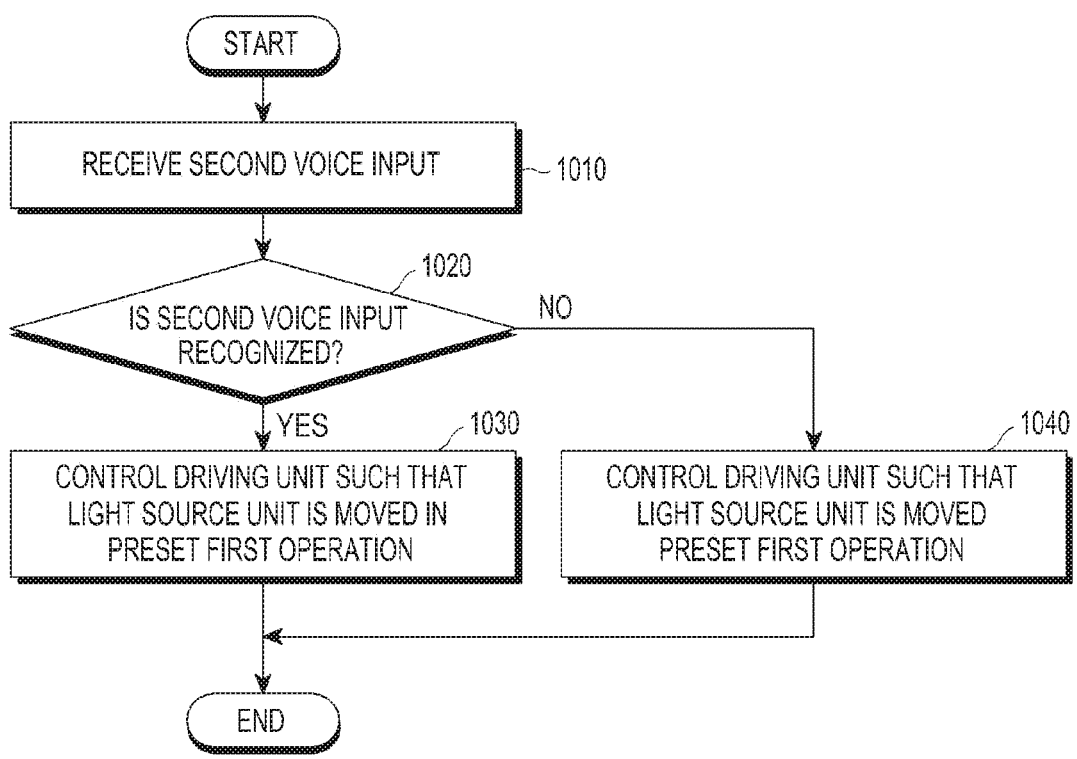
FIG. 10 is a flow chart of an operation corresponding to a second voice input by an electronic device according to an embodiment of the present disclosure.

FIG. 10 is a flow chart of an operation corresponding to a second voice input by the electronic device according to an embodiment of the present disclosure.

Figure 11A:
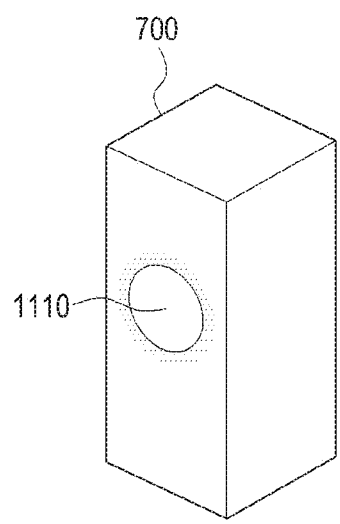
FIGS. 11A to 11C are situation diagrams of an operation corresponding to a second voice input by an electronic device according to an embodiment of the present disclosure.
Figure 11B:
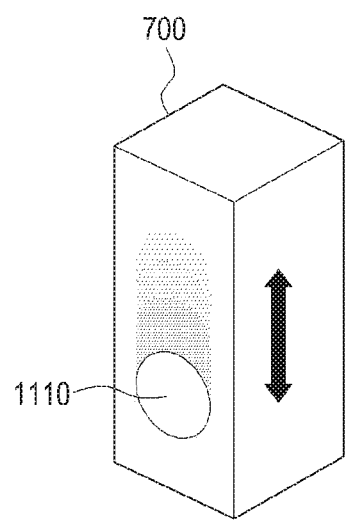
Figure 11C:
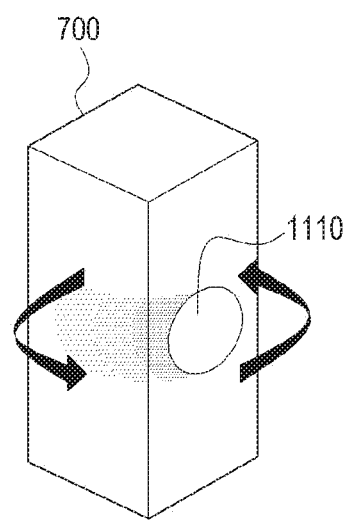

FIGS. 11A to 11C are situation diagrams of an operation corresponding to a second voice input by an electronic device according to an embodiment of the present disclosure.

In step 1010, the control unit 740 receives a second voice input acquired from the user via the voice reception unit 710. Hereinafter, the second voice input may be controlled such that the light source unit 720 described with reference to FIGS. 8 and 9 faces the recognized direction of the user, and the voice input acquired from the user may be indicated.

In addition, after controlling the light source unit 720 to face in the recognized direction of the user, the control unit 740 may control the light source unit 720 in order to inform the user that the user's voice input is expected. For example, as illustrated in FIG. 11A, the control unit 740 may control the light source unit 720 such that the light 1110 displayed on the housing of the electronic device 700 blinks in order to show the user that a voice input is expected. In addition, the control unit 740 may change the size of the light 1110 displayed on the housing according to the distance from the user.

In step 1020, the control unit 740 determines whether the received second voice input is recognized. As described above, various methods may be applied to the method of recognizing the voice input, and a detailed description thereof will be omitted.

In step 1030, when the second voice input is recognized, the control unit 740 controls the driving unit 730 such that the light source unit 720 is moved according to a preset first operation. Here, the first operation may be set as an operation for informing the user that the electronic device 700 has recognized the second voice input. For example, as shown in FIG. 11B, the first operation may be set as an operation of moving up and down. In this case, when the second voice input is recognized, the control unit 740 may control the driving unit 730 such that the light source unit 720 is moved up and down. Accordingly, the light 1110 displayed on the housing is also moved up and down, and the user may intuitively recognize whether the electronic device 700 has recognized the second voice input by looking at the light 1110 moving up and down in the housing.

In step 1040, when the second voice input is not recognized, the control unit 740 controls the driving unit 730 such that the light source unit 720 is moved according to a preset second operation. Here, the second operation may be set as an operation for informing the user that the electronic device 700 has not recognized the second voice input. For example, as illustrated in FIG. 11C, the second operation may be set as an operation of moving left or right or an operation of rotating clockwise or counterclockwise. Also, the second operation may be set as an operation of moving in a question mark shape in order to indicate that the electronic device 700 has not recognized the second voice input.

When the second voice input is recognized, the control unit 740 may control the driving unit 730 such that the light source unit moves left or right, rotates clockwise or counterclockwise, or moves in a question mark shape. Accordingly, the light 1110 displayed on the housing may also be moved left or right, clockwise or counterclockwise, or moved in a question mark shape, and the user may intuitively recognize that the electronic device 700 has not recognized the second voice input by looking at the light 1110 which is displayed on the housing and moves left or right, rotates clockwise or counterclockwise, or moves in the question mark shape. Accordingly, the user may repeat the second voice input to the electronic device 700 again.

In addition, the control unit 740 may control the light source 720 such that the light is displayed on the housing in different colors depending on whether the second voice input is recognized. For example, when the second voice input is recognized, the control unit 740 may control the light source unit 720 to indicate a green color, and when the second voice input is not recognized, the control unit 740 controls the light source 720 to indicate a red color. In addition, when the second voice input is recognized, the control unit 740 may cause the light source 720 to move according to the first operation while indicating a green light, and when the second voice input is not recognized, the control unit 740 may cause the light source unit 720 to move according to the second operation while indicating a red light.

The electronic device 700 may inform the user of whether or not a voice input is recognized, through the light source unit 720. The user may intuitively recognize whether or not his/her voice input is recognized based on the motion or color of the light displayed on the housing.

Figure 12:
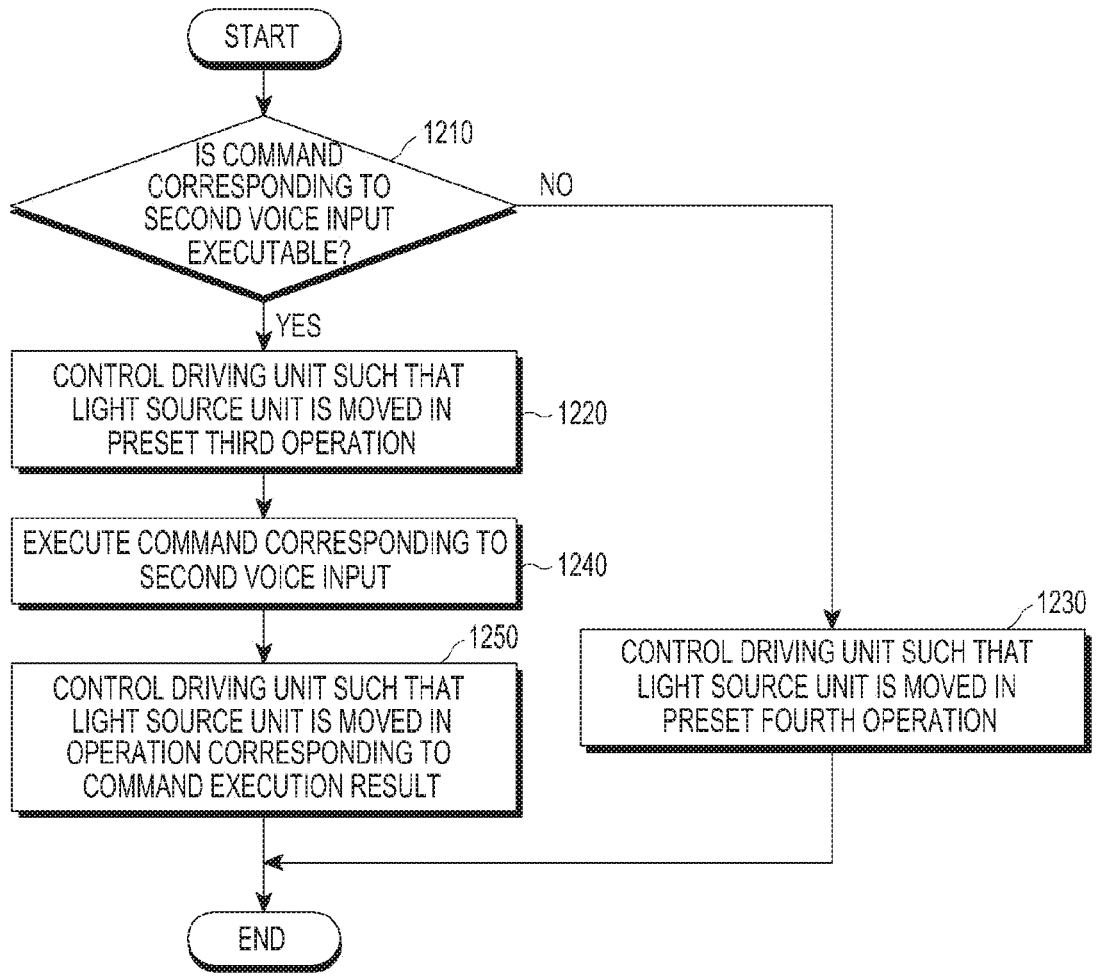
FIG. 12 is a flow chart illustrating a method of conducting a command in response to the second voice input by the electronic device according to an embodiment of the present disclosure.

FIG. 12 is a flow chart illustrating a method of conducting a command in response to the second voice input by the electronic device according to an embodiment of the present disclosure.

In step 1210, when the second voice input is recognized, the control unit 740 determines whether or not the command corresponding to the recognized second voice input is executable. For example, the control unit 740 may retrieve an application or communicate with another electronic device for executing a command corresponding to the second voice input, and may determine whether the command is executable in the retrieved application or electronic device.

In step 1220, when it is determined that the command corresponding to the second voice input is executable, the control unit 740 controls the driving unit 730 such that the light source unit 720 is moved according to a preset third operation. Here, the third operation may be set as an operation for informing the user that the electronic device 700 is capable of executing the command. The third operation may be set as an operation similar to the first operation described with reference to FIGS. 10 and 11.

When it is determined that the command is executable, step 1220 may be omitted, since it is no longer necessary to receive an additional voice input from the user in order to output a result corresponding to the command.

In step 1230, when it is determined that the command corresponding to the second voice input is not executable, the control unit 740 controls the driving unit 730 such that the light source unit 720 is moved according to a preset fourth operation. Here, the fourth operation may be set as an operation for informing the user that the electronic device 700 is not capable of executing the command. The fourth operation may be set as an operation similar to the second operation described with reference to FIGS. 10 and 11.

In step 1240, when it is determined that the command corresponding to the recognized second voice input is executable, the control unit 740 executes the command corresponding to the second voice input. For example, the control unit 740 may execute the command through the retrieved application. In addition, the control unit 740 may transmit the command to the other electronic device through a communication unit of the electronic device 700. The other electronic device receiving the command may perform an operation according to the command.

In step 1250, the control unit 740 controls the driving unit 730 such that the light source unit 720 is moved corresponding to a result of executing the command. In addition, the control unit 740 may control the speaker module of the electronic device 700 such that a voice is output corresponding to the result of executing the command.

Figure 13:
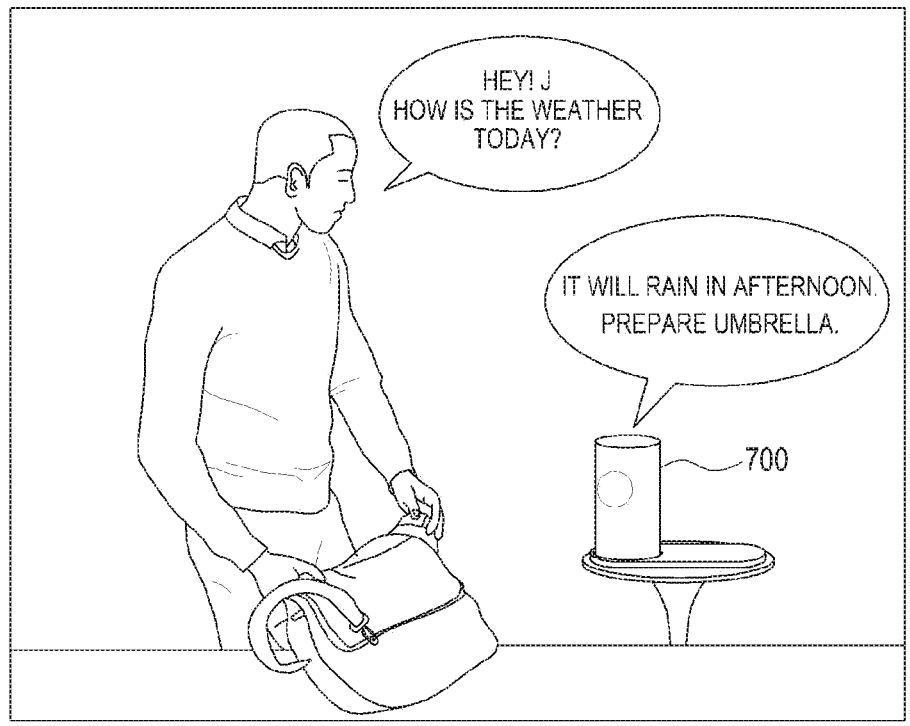
FIG. 13 illustrates an electronic device that responds to a user's question, according to an embodiment of the present disclosure.

FIG. 13 illustrates an electronic device that responds to a user's question, according to an embodiment of the present disclosure.

Referring to FIG. 13, the control unit 740 of the electronic device 700 may receive a voice input "Hey! J, How is the weather today?" from the user via the voice reception unit 710, and may recognize the received first voice input. Since the first voice input "Hey! J," which is the preset first voice input, is included in the recognized voice input, the control unit 740 may determine that the recognized voice input corresponds to the first voice input. Accordingly, the control unit 740 may recognize the direction of the user using the plurality of microphones included in the voice reception unit 710, and may control the driving unit 730 such that the light source unit 720 may face in the recognized direction of the user.

When the voice input "Hey! J, how is the weather today?" is recognized, the control unit 740 may control the driving unit 730 such that the light source unit 720 is moved up and down, which is the preset first operation.

The control unit 740 may determine whether or not today's weather retrieval command, which is a command corresponding to the recognized voice input, is executable. The control unit 740 may retrieve an application to execute the command and may execute today's weather retrieval command through the retrieved application. The control unit 740 may output the result of executing today's weather retrieval command through at least one of the light source unit 720 and the speaker module of the electronic device 700.

For example, as illustrated in FIG. 13, the control unit 740 may control the speaker module to output a rain sound together with a voice "It will rain in afternoon. Prepare umbrella," which is a result of today's weather retrieval. In addition, the control unit 740 may control the driving unit 730 such that the light source unit 720 faces the sky. In addition, the control unit 740 may cause the color of the light to be output through the light source 720 is displayed as a gray color such that the user intuitively recognizes the rainy weather.

Figure 14:
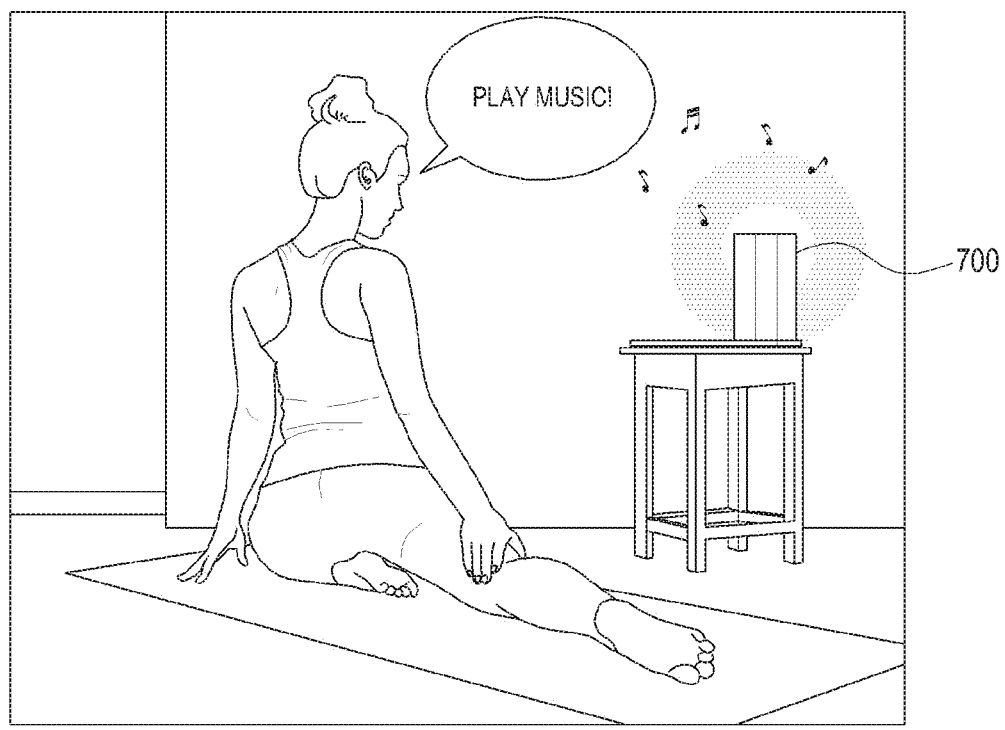
FIG. 14 illustrates an electronic device that outputs music according to a user's command, according to an embodiment of the present disclosure.

FIG. 14 illustrates an electronic device that outputs music according to a user's command, according to an embodiment of the present disclosure.

Referring to FIG. 14, the control unit 740 of the electronic device 700 may receive a voice input "Play music!" from the user via the voice reception unit 710, and may recognize the voice input.

When the voice input "Play music!" is recognized, the control unit 740 may control the driving unit 730 such that the light source unit 720 is moved up and down, which is the preset first operation.

The control unit 740 may determine whether or not the music output command corresponding to the recognized voice input is executable. The control unit 740 may retrieve an application to execute the command and may execute the music output command through the retrieved application. The control unit 740 may output the result of executing the music output command through the light source unit 720 and the speaker module of the electronic device 700.

For example, as illustrated in FIG. 14, the control unit 740 may control the speaker module to output music preset by the user. In addition, the control unit 740 may control the driving unit 730 such that the light source unit 720 is moved according to a preset operation in accordance with the output music.

For example, the control unit 740 may control the light source unit 720 such that the light source unit 720 rapidly changes the color of light emitted for fast music and makes a large color change. In addition, the control unit 740 may control the driving unit 730 such that the light source unit 720 moves quickly for fast music. In addition, the control unit 740 may control the light source unit 720 such that the light source unit 720 slowly changes the color of light emitted for slow music and makes a small color change. In addition, the control unit 740 may control the driving unit 730 such that the light source unit 720 moves slowly for slow music.

Figure 15:
FIGS. 15 and 16 illustrate an electronic device that operates at an alarm time set by a user, according to an embodiment of the present disclosure.
Figure 16:
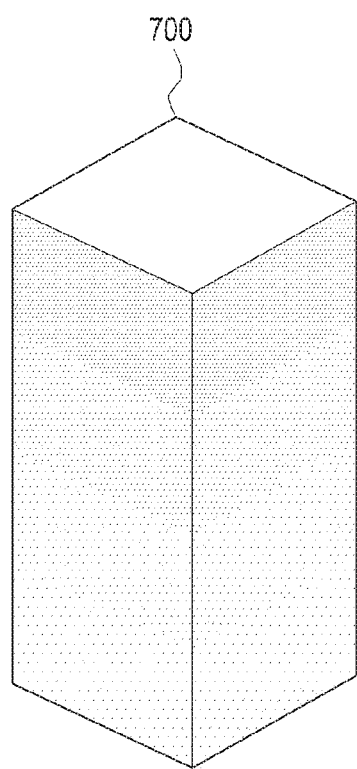

FIGS. 15 and 16 illustrate an electronic device that operates at an alarm time set by a user, according to an embodiment of the present disclosure.

Referring to FIG. 15, the control unit 740 of the electronic device 700 may increase the illuminance of the light emitted from the light source unit 720 when the alarm time set by the user arrives. In addition, the control unit 740 may effectively inform the user that the alarm time has arrived by increasing the illuminance of the emitted light while moving the light source unit 720 from a lower position to a higher position. In addition, when the alarm time arrives, the control unit 740 may also output music set by the user through the speaker module of the electronic device 700.

When the sleeping time set by a user input or the user arrives, the control unit 740 may reduce the illuminance of the light emitted from the light source unit 720.

In addition, when the sleeping time set by the user input or the user arrives, the control unit 740 may perform a control such that the light source faces the reflective plate of the electronic device 700. The control unit 740 may control at least one of the illuminance of the light source unit 720 and the direction of the light source unit 720 such that a gradation effect is obtained through the respective faces of the housing allowing light to be emitted gently through the entire housing of the electronic device 700, as shown in FIG. 16.

Figure 17:
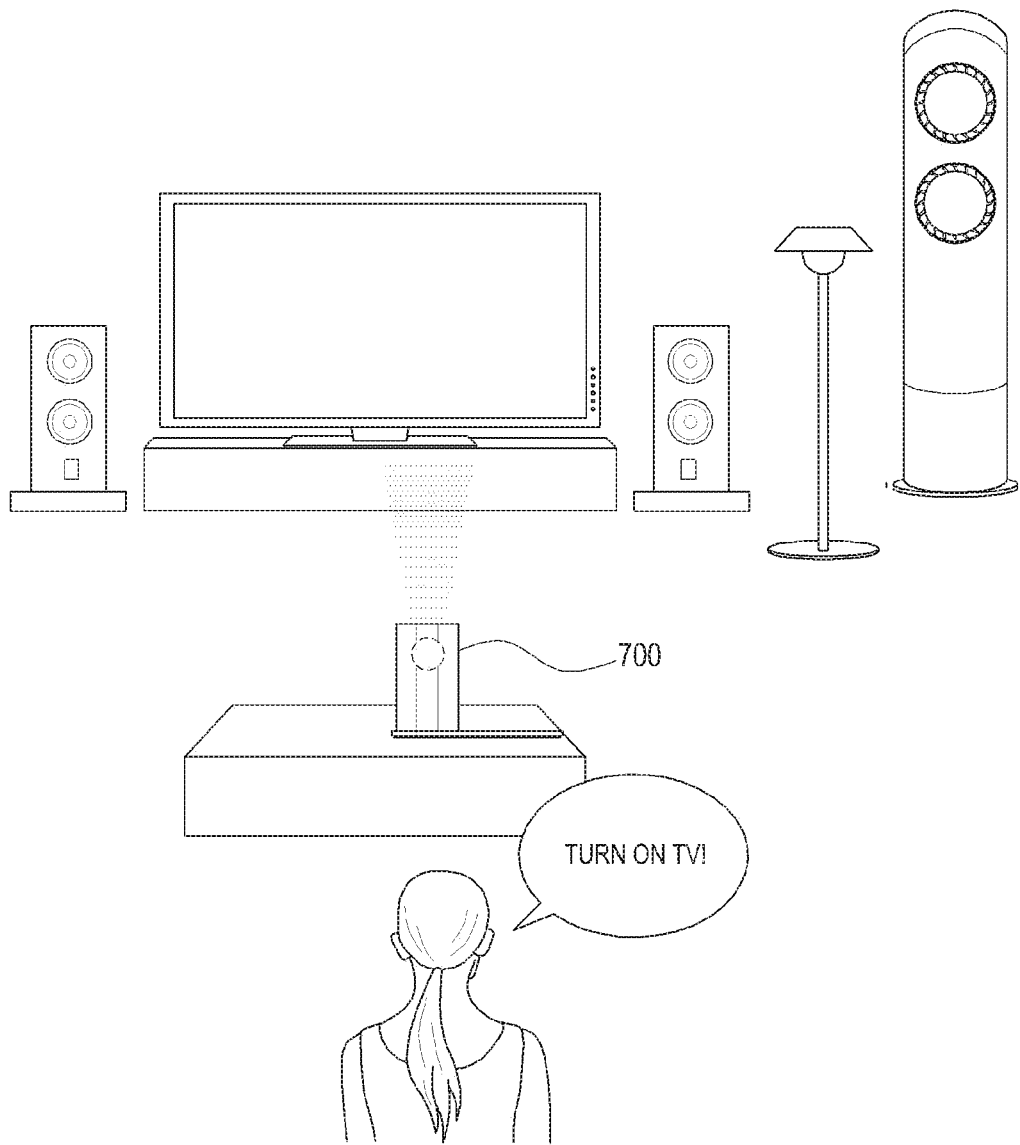
FIG. 17 illustrates a method of controlling another electronic device by an electronic device according to an embodiment of the present disclosure.

FIG. 17 illustrates a method of controlling another electronic device by an electronic device according to an embodiment of the present disclosure.

Referring to FIG. 17, the control unit 740 of the electronic device 700 may receive a voice input "Turn on TV!" from the user via the voice reception unit 710, and may recognize the voice input.

When the voice input "Turn on TV!" is recognized, the control unit 740 may control the driving unit 730 such that the light source unit 720 is moved up and down, which is the preset first operation.

The control unit 740 may determine whether or not a TV power turn-on command corresponding to the recognized voice input is executable. The control unit 740 may determine whether a TV exists among other electronic devices, and when it is determined that a TV exists, the control unit 740 may transmit a command to the TV for turning on the power of the TV through the communication unit of the electronic device 700. The TV receiving the command may turn on the power.

When the TV exists, the control unit 740 may control the driving unit 730 such that the light source unit 720 faces a direction where the TV is positioned. The control unit 740 may recognize the positions of other electronic devices, and may store information for the positions of the other electronic devices. Accordingly, the control unit 740 may control the driving unit 730 such that the light source unit 720 faces the direction where the TV is positioned. When the user provides a voice input "Increase air conditioner temperature!" to the electronic device 700, the control unit 740 may recognize and deliver the command to the air conditioner, and may control the driving unit 730 such that the light source unit 720 faces the direction where the air conditioner is positioned allowing the user to intuitively recognize that the electronic device 700 is performing an operation according to the voice command of the user.

In addition, the control unit 740 may control the light source 720 such that light is displayed as a preset color with respect to the TV. The control unit 740 may recognize other electronic devices, and may set a color corresponding to each of the other electronic devices according to the user's input. Accordingly, the control unit 740 may control the light source unit 720 such that a color corresponding to the TV is displayed. When the user provides a voice input "Increase air conditioner temperature!" to the electronic device 700, the control unit 740 may recognize and deliver the command to the air conditioner, and may control the light source unit 720 to emit light having a color corresponding to the air conditioner allowing the user to intuitively recognize that the electronic device 700 is performing an operation according to the voice command of the user.

Each of the components described herein may consist of one or more components, and the names of the corresponding components may vary depending on a type of an electronic device. In an embodiment of the present disclosure, the electronic device may be configured to include at least one of the elements disclosed herein, and some elements may be omitted. The electronic device may further include other additional elements. In addition, some of the elements of the electronic device may be configured as one entity such that the functions of the corresponding elements prior to the assembly may be equally performed.

The term "module" as used herein may include a unit configured with hardware, software, or firmware, and may be used interchangeably with terms of, for example, "logic," "logic block," "component, "circuit," and the like. The "module" may be an integrally constructed component or a minimum unit or a part thereof that performs one or more functions. The "module" may be implemented either mechanically or electronically, and may include, for example, application-specific integrated circuit (ASIC) chips, field-programmable gate arrays (FPGAs), or programmable logic devices.

At least some of the devices (e.g., modules or functions thereof) or methods (e.g., operations) according to an embodiment of the present disclosure may be implemented by commands stored in a computer-readable storage media (e.g., a memory), for example, in the form of a program module. When the commands are executed by a processor, the processor may perform a function corresponding to the commands.

The computer readable recording medium may include a hard disk, a floppy disk, a magnetic medium (e.g., a magnetic tape), an optical recording medium (e.g., a CD-ROM, a DVD), a magneto-optical medium (e.g., a floppy disk), an internal memory, and the like. The commands may include codes that are generated by a compiler or codes that are executable by an interpreter. Modules or program modules according to an embodiment of the present disclosure may include one or more of the above-described elements, may omit some of the elements, or may further include other elements. Operations performed by the modules, the program modules, or other components may be performed sequentially, in parallel, repetitively, or heuristically, or at least some operations may be performed in a different order or omitted, or other operations may be added thereto.

According to an embodiment of the present disclosure, in a storage medium storing commands, the commands are set to cause at least one processor to perform at least one operation when executed by the at least one processor. The commands may include an operation that, when a first voice input acquired from the user corresponds to a preset voice input, detects the intensity of the first voice input, an operation that recognizes a direction of the user using the detected intensity of the first voice input, an operation that drives the light source unit of the electronic device such that the light source unit faces the recognized direction of the user, and an operation that controls the driving unit of the electronic device such that the light source unit is moved in a preset first operation when a second voice input acquired from the user is recognized after the light source unit is driven to face the recognized direction of the user.

In addition, the embodiments disclosed herein are presented for the purpose of explanation and understanding of the present disclosure and do not limit the scope of the technology described in the present disclosure. Accordingly, the scope of the present disclosure should be interpreted to include all the modifications based on the technical idea of this document, or various other embodiments.

According to an embodiment of the present disclosure, there is provided a voice recognition electronic device that includes a housing including a first face that faces a first direction, a second face that faces a second direction opposite to the first direction, and a third face disposed between the first face and the second face, and further including a translucent cover that forms at least a portion of the third face, a voice reception unit disposed below the first face of the housing and including a plurality of microphones that receive a voice input from a user, a light source unit disposed inside the housing to emit light; a driving unit connected to the light source unit to control the light source unit to move according to a preset operation, and a control unit that controls the driving unit in response to the voice input of the user, which is delivered from the voice reception unit.

According to an embodiment of the present disclosure, the electronic device further includes a reflective plate that is disposed to face the light source unit and irregularly reflects light emitted from the light source unit to provide the light to the translucent cover disposed on an outer face of the housing.

According to an embodiment of the present disclosure, the voice reception unit includes at least one microphone hole exposed through the first face, and a printed circuit board on which a conversion unit that receives a voice of the user delivered from the at least one microphone hole and converts the voice into a voice signal.

According to an embodiment of the present disclosure, the third face of the housing includes an outer skin member forming an outer face of the housing, and the translucent cover disposed inside the outer skin member and configured in a shape corresponding to the outer skin member.

According to an embodiment of the present disclosure, the electronic device may further include a supporting member on which the printed circuit board may be seated below the first face of the housing, and the driving unit or the reflective plate may be disposed at a lower end of the supporting member.

According to an embodiment of the present disclosure, the electronic device further includes a speaker module disposed inside the housing to the sound reception unit inside the housing, and the reflective plate and the light source unit may be disposed in a resonance space formed above the speaker module inside the housing.

According to an embodiment of the present disclosure, the reflective plate is formed in a hemispherical shape that protrudes toward the light source unit.

According to an embodiment of the present disclosure, the center of the driving unit and the center of the reflective plate are arranged on the same line.

According to an embodiment of the present disclosure, the driving unit includes a first driving motor that drives the light source unit such that the light of the light source unit rotates in a horizontal direction to face the third face of the housing, and a second drive motor that drives the light source unit such that the light of the light source unit rotates in a direction perpendicular to the first face or the second face of the housing.

According to an embodiment of the present disclosure, the light source unit includes a circular circuit board and a plurality of light sources on the circuit board, and the plurality of light sources may be arranged on a pattern formed along at least one circular line.

According to an embodiment of the present disclosure the plurality of light sources includes a central light source disposed at the center of the circuit board, a plurality of inner light sources disposed on a circular line formed around the central light source, and a plurality of outer light sources disposed on a circular line formed around the internal light sources.

According to an embodiment of the present disclosure, the reflective plate is disposed on a path of the light emitted from the light source unit to face the first direction or the second direction.

According to an embodiment of the present disclosure, the control unit recognizes the first voice input acquired from the user through the voice reception unit and, when the recognized first voice input corresponds to a preset voice input, may detect an intensity of the first voice input acquired through each of the plurality of microphones, and may recognize the direction of the user using the detected intensity of the first voice input.

According to an embodiment of the present disclosure, the control unit controls the driving unit such that the light source unit faces the recognized direction of the user.

According to an embodiment of the present disclosure, when a second voice input acquired from the user is recognized through the voice reception unit, the control unit controls the driving unit such that the light source unit is moved in a preset first operation.

According to an embodiment of the present disclosure, when a second voice input acquired from the user is not recognized through the voice reception unit, the control unit controls the driving unit such that the light source unit is moved in a preset second operation.

According to an embodiment of the present disclosure, the control unit determines whether or not a command corresponding to the recognized second voice input is executable.

According to an embodiment of the present disclosure, when it is determined that the command corresponding to the recognized second voice input is executable, the control unit controls the driving unit such that the light source unit is moved in a preset third operation.

According to an embodiment of the present disclosure, when it is determined that the command corresponding to the recognized second voice input is not executable, the control unit controls the driving unit such that the light source unit is moved in a preset fourth operation.

According to an embodiment of the present disclosure, when it is determined that the command corresponding to the recognized second voice input is executable, the control unit executes a command corresponding to the second voice input and controls the driving unit such that the light source unit is moved in an operation corresponding to a command execution result.

According to an embodiment of the present disclosure, the electronic device further includes a speaker module disposed inside the housing to face the voice reception unit. The control unit controls the speaker module such that a voice signal corresponding to the command execution result is output.

According to an embodiment of the present disclosure, when it is determined that the command corresponding to the recognized second voice input is executable, the control unit communicates with an electronic device to execute the command among a plurality of other electronic devices, transmits the command to the electronic device, and controls the driving unit such that the light source unit faces the direction of the electronic device.

According to an embodiment of the present disclosure, there is provided a non-transitory computer-readable recording medium which stores a program to be executed on a computer. The program includes a command which, when executed by the processor, causes the processor to execute an operation that, when a first voice input acquired from a user corresponds to a preset voice input, detects the intensity of the first voice input, an operation that recognizes a direction of the user using the detected intensity of the first voice input, an operation that drives a light source unit of an electronic device such that the light source unit faces the recognized direction of the user, and an operation that controls a driving unit of the electronic device such that the light source unit is moved in a preset first operation when a second voice input acquired from the user is recognized after the light source unit is driven to face the recognized direction of the user.

While the disclosure has been shown and described with reference to certain preferred embodiments thereof, it will be understood by those skilled in the art that various changes in form and detail may be made therein without departing from the spirit and scope of the disclosure as defined by the appended claims and their equivalents.

What is claimed is:
1. A voice recognition electronic device comprising:
a housing including a first face that faces a first direction, a second face that faces a second direction opposite to the first direction, a third face disposed between the first face and the second face, and a translucent cover that forms at least a portion of the third face;
a microphone configured to be disposed below the first face of the housing and receiving a voice input from a user;
a plurality of light emitting diodes (LEDs) configured to be disposed inside the housing to emit light;
a driver device including a driving motor connected to the plurality of LEDs and configured to move the plurality of LEDs according to a preset operation; and
a controller configured to control the driver device in response to the voice input of the user, which is delivered from the microphone.

2. The voice recognition electronic device of claim 1, further comprising:
a reflective plate disposed to face the plurality of LEDs and irregularly reflect light emitted from the plurality of LEDs to provide the light to the translucent cover disposed on an outer face of the housing.

3. The voice recognition electronic device of claim 2, wherein the microphone includes:
at least one microphone hole exposed through the first face; and
a printed circuit board including a conversion unit that receives a voice of the user delivered from the at least one microphone hole and converts the voice into a voice signal.

4. The voice recognition electronic device of claim 3, wherein the third face of the housing includes:
- an outer skin member forming an outer face of the housing; and
- the translucent cover disposed inside the outer skin member and configured in a shape corresponding to the outer skin member.

5. The voice recognition electronic device of claim 4, further comprising:
- a supporting member on which the printed circuit board is seated below the first face of the housing,
- wherein the driver device or the reflective plate is disposed at a lower end of the supporting member.

6. The voice recognition electronic device of claim 3, wherein the reflective plate is disposed on a path of the light emitted from the plurality of LEDs to face the first direction or the second direction.

7. The voice recognition electronic device of claim 2, further comprising:
- a speaker disposed inside the housing, wherein the reflective plate and the plurality of LEDs are disposed in a resonance space formed above the speaker inside the housing.

8. The voice recognition electronic device of claim 2, wherein the reflective plate is formed in a hemispherical shape that protrudes toward the plurality of LEDs, and
- wherein a center of the driver device and a center of the reflective plate are arranged on a same line.

9. The voice recognition electronic device of claim 1, wherein the driver device includes:
- a first driving motor that drives the plurality of LEDs such that light of the plurality of LEDs rotates in a horizontal direction to face the third face of the housing; and
- a second driving motor that drives the plurality of LEDs such that the light of the plurality of LEDs rotates in a direction perpendicular to the first face or the second face of the housing.

10. The voice recognition electronic device of claim 1, wherein the plurality of LEDs are disposed on a printed circuit board, and the plurality of LEDs are arranged on a pattern formed along at least one circular line.

11. The voice recognition electronic device of claim 10, wherein the plurality of LEDs include:
- a central light emitting device (LED) disposed at the center of the circular printed circuit board;
- a plurality of inner LEDs disposed on a circular line formed around the central LED; and
- a plurality of outer LEDs disposed on a circular line formed around the internal LEDs.

12. The voice recognition electronic device of claim 1, wherein the controller recognizes the first voice input acquired from the user through the microphone and, when the recognized first voice input corresponds to a preset voice input, detects an intensity of the first voice input acquired through each of the plurality of microphones, and recognizes a direction of the user based on the detected intensity of the first voice input, and
- wherein the controller controls the driver device such that the plurality of LEDs face the recognized direction of the user.

13. The voice recognition electronic device of claim 1, wherein, when a second voice input acquired from the user is recognized through the microphone, the controller controls the driver device such that the plurality of LEDs are moved according to a preset first operation, and wherein the controller determines whether a command corresponding to the recognized second voice input is executable.

14. The voice recognition electronic device of claim 13, wherein, when it is determined that the command corresponding to the recognized second voice input is executable, the controller controls the driver device such that the plurality of LEDs are moved according to a preset third operation.

15. The voice recognition electronic device of claim 13, wherein, when it is determined that the command corresponding to the recognized second voice input is not executable, the controller controls the driver device such that the plurality of LEDs are moved according to a preset fourth operation.

16. The voice recognition electronic device of claim 13, wherein, when it is determined that the command corresponding to the recognized second voice input is executable, the controller executes a command corresponding to the second voice input and controls the driver device such that the plurality of LEDs are moved according to an operation corresponding to a command execution result.

17. The voice recognition electronic device of claim 16, further comprising:
- a speaker disposed inside the housing to face the microphone,
- wherein the controller controls the speaker such that a voice signal corresponding to the command execution result is output.

18. The voice recognition electronic device of claim 13, wherein, when it is determined that the command corresponding to the recognized second voice input is executable, the controller communicates with an electronic device to execute the command among a plurality of other electronic devices, transmits the command to the electronic device, and controls the driver device such that the plurality of LEDs face the direction of the electronic device.

19. The voice recognition electronic device of claim 1, wherein, when a second voice input acquired from the user is not recognized through the microphone, the controller controls the driver device such that the plurality of LEDs are moved according to a preset second operation.

20. A non-transitory computer-readable recording medium which stores a program to be executed on a processor, wherein the program includes a command which, when executed by the processor, causes the processor to:
- when a first voice input acquired from a user corresponds to a preset voice input, detect an intensity of the first voice input;
- recognize a direction of the user using the detected intensity of the first voice input;
- drive a plurality of LEDs of a first electronic device such that the plurality of LEDs face the recognized direction of the user;
- control a driver device of the first electronic device such that the plurality of LEDs are moved according to a preset first operation when a second voice input acquired from the user is recognized after the plurality of LEDs are driven to face the recognized direction of the user;
- determine whether a command corresponding to the recognized second voice input is executable; and
- when it is determined that the command corresponding to the recognized second voice input is executable, control the driver device such that the plurality of LEDs are moved according to a preset third operation, wherein, when it is determined that the command corresponding to the recognized second voice input is executable, the processor communicates with a second electronic device to execute the command, transmits the command to the second electronic device, and controls the driver device such that the plurality of LEDs face the direction of the second electronic device.

\* \* \* \* \*